United States Patent [19]
Conrad

[11] 3,735,215
[45] May 22, 1973

[54] SELF-POWERED RELAY TARGET CIRCUIT

[75] Inventor: Richard R. Conrad, Bristol, Pa.

[73] Assignee: I-T-E Imperial Corporation, Spring House, Pa.

[22] Filed: June 8, 1972

[21] Appl. No.: 260,750

Related U.S. Application Data

[63] Continuation of Ser. No. 41,420, May 28, 1970, abandoned.

[52] U.S. Cl. .............. 317/33 SC, 317/27 R, 317/151, 340/248 R; 253 R
[51] Int. Cl. ................................................H02b 7/00
[58] Field of Search ..................... 340/253 R, 253 A, 340/253 M, 248 R, 248 B, 253 P; 317/27, 149, 151, 33 SC

[56] References Cited

UNITED STATES PATENTS

| 3,573,556 | 4/1971 | Zocholl | 317/33 SC |
| 3,319,127 | 5/1967 | Zocholl et al. | 317/27 |

Primary Examiner—J. D. Miller
Assistant Examiner—Harry E. Moose, Jr.
Attorney—Ostrolenk, Faber, Gerb & Soffen

[57] ABSTRACT

A relay target circuit is operated directly from the stored energy in a solid state relay circuit, after the relay circuit becomes conductive. Circuits are provided in which a-c and d-c control voltage sources are used and in which a diode is connected to the trip circuit to prevent a false set signal by transients in the tripping circuit. Parallel indicator circuits are used with a common reset switch.

3 Claims, 5 Drawing Figures

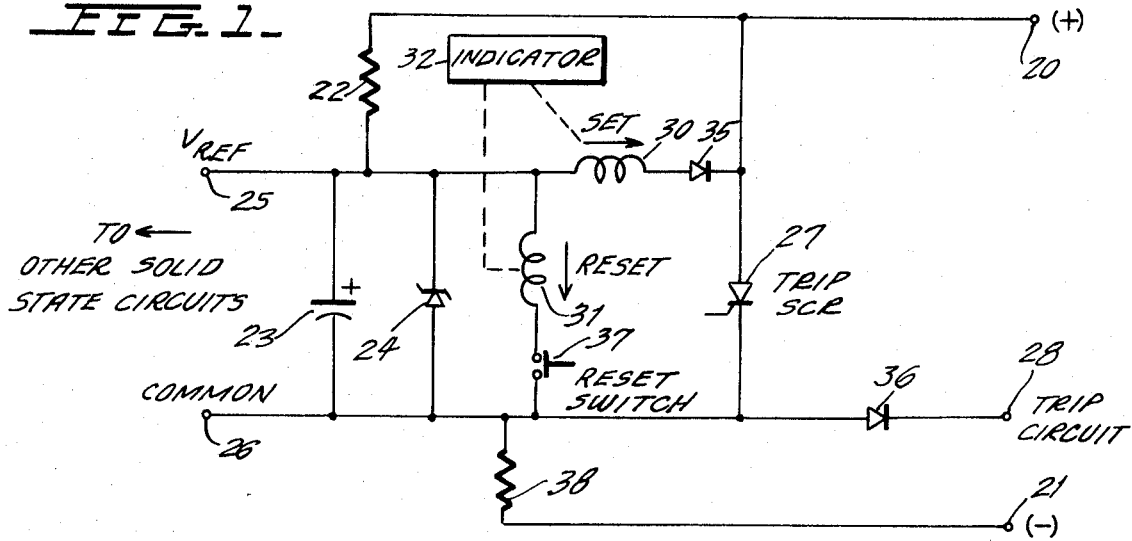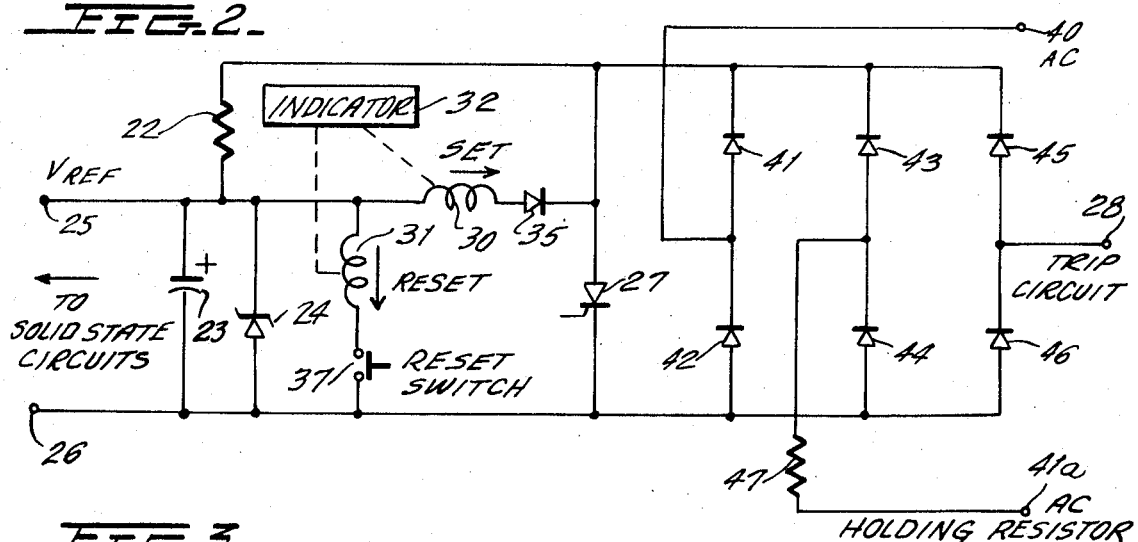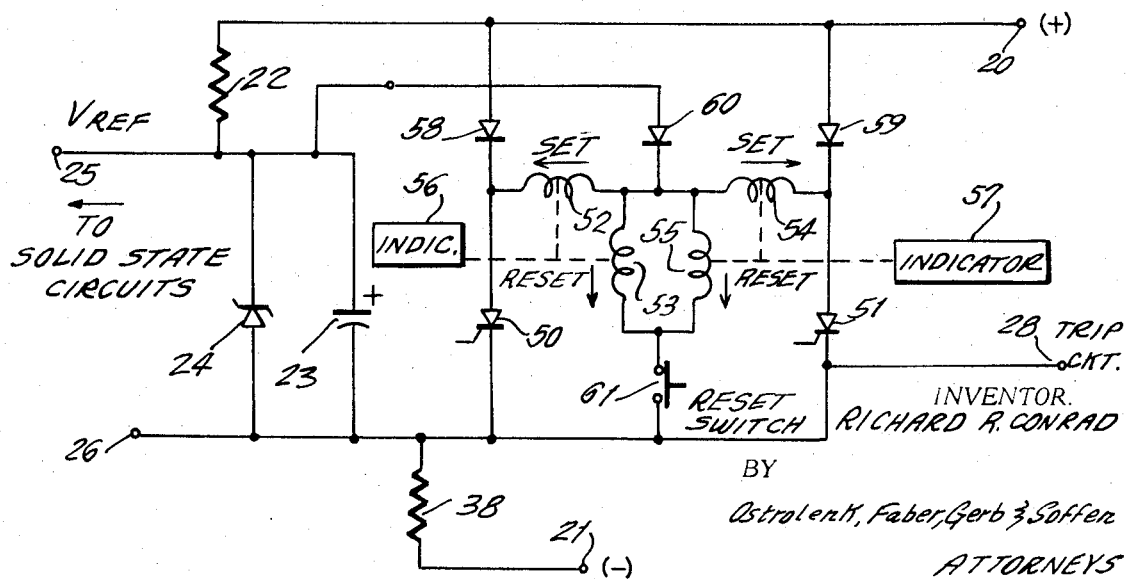

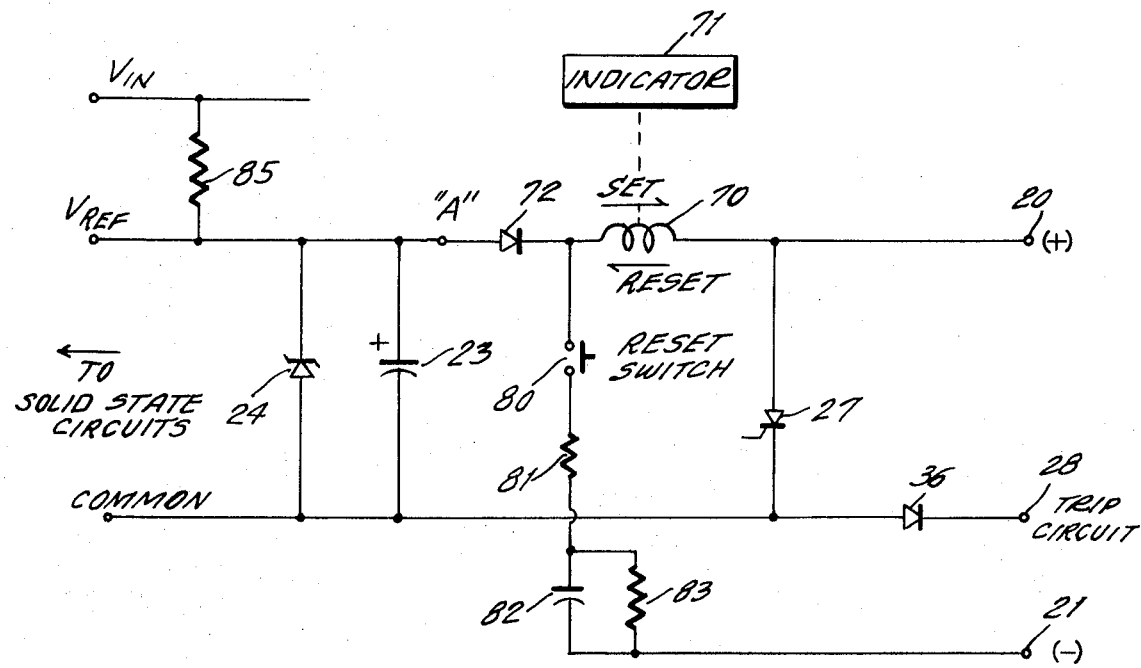
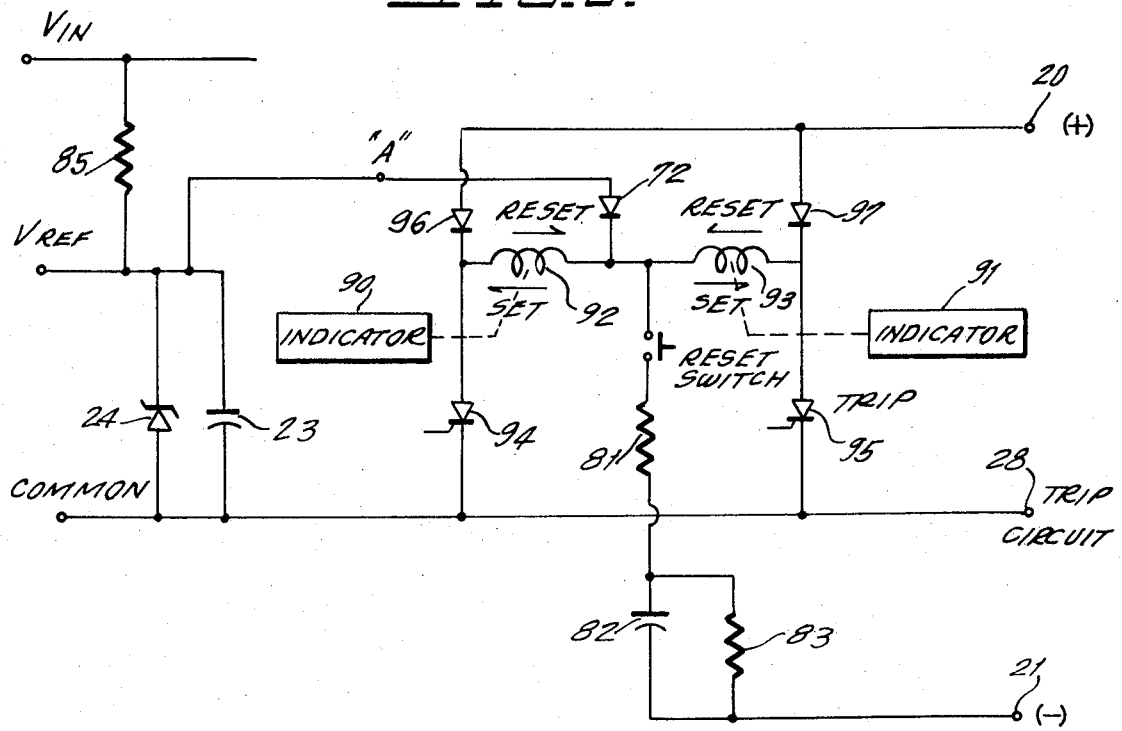

SELF-POWERED RELAY TARGET CIRCUIT

RELATED CASES

This is a continuation of application Ser. No. 41,420 filed May 28, 1970, now abandoned.

This invention is an improvement of copending application Ser. No. 826,932, filed May 22, 1969, now U.S. Pat. 3,573,556, in the name of Zocholl, entitled "Operation Indicator Circuit for Static Overcurrent Relays," and assigned to the assignee of the present invention, and is to be used with solid-state relay circuits of the type shown in U. S. Pat. No. 3,319,127 to Zocholl et al.

SUMMARY OF INVENTION

The stored energy of a solid-state relay circuit is used for operating an indicating device for indicating the firing of a controlled rectifier associated with the solid-state relay circuit. The indicator circuit operates to a "set" condition even though control power is lost. Either a-c or d-c control power can be used, and more than a single indicator circuit can be provided.

BRIEF DESCRIPTION OF DRAWINGS

FIG. 1 shows a circuit diagram of one embodiment of the invention.

FIG. 2 shows the circuit of FIG. 1 modified for a-c control power.

FIG. 3 shows the circuit of FIG. 1 modified for parallel-indicator circuit operation.

FIG. 4 shows a further embodiment of the invention.

FIG. 5 shows the modification of FIG. 4 for parallel-circuit operation.

DESCRIPTION OF PREFERRED EMBODIMENTS

Referring first to FIG. 1, there is shown, in part, a solid-state type relay which includes a d-c input at terminals 20 and 21, which could be derived, for example, from the rectified output of a current transformer (not shown), connected to a circuit being monitored. Current-limiting resistor 22, filter capacitor 23 and zener diode 24 then form a reference voltage source for the operation of the solid-state relay, and the constant voltage across terminals 25 and 26 is then used to drive other parts of the solid-state relay in a manner not pertinent to the present invention. The controlled rectifier 27 is the controlled rectifier which is fired from the relay circuit and is connected to the trip circuit output terminal 28 to effect, for example, disconnection of the circuit being monitored in response to given fault conditions.

In the following, it will be seen that the relay components required for use with the present invention are the constant voltage reference source capacitor 23 and controlled rectifier 27.

The target circuit of the present invention includes use of the set coil 30 and reset coil 31 connected, as shown, which operate indicator 32, where these coils are operated from the relay stored energy. Coil 30 and reset coil 31 may be the device known as an electromagnetic status indicator, made by Ferranti-Packard Electric Ltd., of Toronto, Canada. This device is built as a three-terminal device having one coil with a center tap. The rated drive requirement is a 4.2 volt d-c, 250 milliampere pulse, lasting for 1 millisecond for each coil, set or reset. These coils are magnetically coupled to an indicator which is moved between an indicating and non-indicating position, responsive to indication of the set or reset coil, respectively. Devices of this type are shown in copending application Ser. No. 826,932, now U.S. Pat. No. 3,573,556 noted above.

Diode 35 is connected in series with set coil 30 to block current from terminal 20, through set coil 30 and into the reference circuit. Diode 36 is connected in series with terminal 28 to prevent false "set" indications originating in the external tripping circuits when tripping is initiated by external circuits.

In order to operate the reset coil 31, a momentary switch 37 is provided, connected in series with coil 31. The common terminal of the reference voltage circuit is then connected to terminal 21 through resistor 38.

In operation, it is assumed that indicator 32 is in a non-indicating position, and that the circuit being monitored is operated through the solid-state relay circuit. That is, a firing signal is applied to the gate of controlled rectifier 27. The firing of controlled rectifier 27 permits the passage of a pulse from capacitor 23, through set coil 30, diode 35, controlled rectifier 27, and back to the negative side of capacitor 23. Indicator 32 will then operate to an indicating position, indicating that controlled rectifier 27 has fired. After energization of the trip circuit, the controlled rectifier 27 will extinguish, the resistor 38 being large enough to limit current between terminals 20 and 21 to below the holding current of controlled rectifier 27.

The target or indicator 32 is reset by closing contact 37 and discharging capacitor 23 through reset coil 31. Note that capacitor 23 can recharge through resistor 38 if the trip circuit is open but the terminals 20 and 21 are energized.

FIG. 2 is similar to FIG. 1, but shows the circuit using a-c control power rather than d-c control power. In FIG. 2, components similar to those of FIG. 1 are given similar identifying numerals. An a-c input circuit of this type is disclosed in copending application Ser. No. 673,583, filed Oct. 9, 1967, now U.S. Pat. No. 3,478,250, in the name of Zocholl et al, entitled "Static A.C. Switching Circuit," and assigned to the assignee of the present invention. In the circuit of FIG. 2, control power is taken from a-c terminals 40 and 41a, which are connected to the rectifier bridge including diodes 41 to 44. Diodes 45 and 46 connect the circuit output to trip circuit terminal 28. An a-c holding resistor 47 performs the recharge function of resistor 38.

FIG. 3 illustrates the manner in which the circuit of the invention can be used when the indication must show which of two (or more) different modes of tripping initiated the trip. Thus, such a relay might have both a time-delay element and an instantaneous element, with separate targets to indicate which element operated. In FIG. 3, components similar to those of FIG. 1 have similar identifying numerals. FIG. 3, however, shows two controlled rectifiers 50 and 51 which are tripped responsive to different conditions, such as instantaneous trip and time-delay trip, respectively.

A respective pair of set and reset coils 52–53 and 54–55 are provided for controlled rectifiers 50 and 51, respectively, each pair connected to respective indicator targets 56 and 57, respectively. Diodes 58 and 59 are connected in series with controlled rectifiers 50 and 51 to direct "set" pulses to the appropriate set coil. Diode 60 serves the function of diode 35 of FIG. 1. A single reset switch 61 is provided for reset coils 53 and 55, although separate reset switches could have been used.

The operation of the circuit of FIG. 3 is similar to that of FIG. 1, except that the two indicator systems including indicators 56 and 57 are in parallel.

It should be noted that the circuit of FIG. 3 could be modified to use a-c control voltage in the manner described in FIG. 2.

FIG. 4 illustrates a modification of the invention for the case where control power is not used to operate the relay circuits. Thus, this type circuit is used, for example, with overcurrent relay circuits whose internal circuitry is operated solely from an input signal derived from the overall current condition itself. The set function is still accomplished as in FIG. 1, but the circuit and indicator are modified to perform the reset function.

In FIG. 4, components similar to those of FIG. 1 are given similar identifying numerals. FIG. 4, however, provides a single set and reset coil 70, formed of the series connection of the set and reset coils of FIGS. 1 to 3, where these coils operate indicator 71. A diode 72 is provided to block current flow into the solid-state circuit from the control voltage terminal 20, while allowing a "set" pulse to flow from capacitor 23, through coil 70, in a "set" direction, and through controlled rectifier 27, responsive to firing of controlled rectifier 27.

Reset operation is obtained in FIG. 4 by closing reset switch 80, to allow current flow from terminal 20 through coil 70 in the reset direction, through current-limiting resistor 81 and into capacitor 82. Resistor 81 is chosen to limit the peak-current value of this discharge current while resistor 83 discharges capacitor 82 after reset switch 80 operates.

It is to be noted that with the circuit of FIG. 4, the target circuit at point "A" can be connected to other energy sources within the solid-state circuit, such as level measuring filters, or directly to the signal $V_{IN}$ being monitored, if the proper minimum voltage and currents are available.

If desired, the circuit of FIG. 4 could be modified for operation with a-c input, rather than d-c input in the manner shown generally in FIG. 2.

FIG. 5 illustrates the manner in which the circuit of FIG. 4 can be adapted for operation with two or more indicator sections. Thus, in FIG. 5, and in the manner of FIG. 3, two indicators 90 and 91, cooperating with coils 92 and 93, respectively, are provided for controlled rectifiers 94 and 95, respectively, which fire responsive to different conditions. As in FIG. 3, each of the controlled rectifiers 94 and 95 is connected in series with diodes 96 and 97, respectively. Clearly, the circuit of FIG. 5 could use a-c control power when modified as shown in FIG. 3.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

The embodiments of the invention in which an exclusive privilege or property is claimed are defined as follows:

1. In combination, a solid-state relay and an indicator circuit; said solid-state relay including circuit means for monitoring the operation of an electrical circuit, a controlled rectifier fired responsive to a predetermined circuit condition in said electrical circuit, a capacitor circuit for defining a voltage reference for said solid-state relay including a capacitor charged to a given voltage and a reference zener diode connected in parallel with said capacitor, an output trip circuit, and means connecting said controlled rectifier and output trip circuit in circuit relation; said indicator circuit comprising a set coil, a reset coil, and indicator means connected to said set coil and reset coil and operable to a set condition and reset condition responsive to energization of said set coil and reset coil, respectively, a reset switch, and a diode; said set coil connected in series with said diode, said capacitor and said controlled rectifier; said reset coil connected in series with said capacitor and said reset switch; and a source of d-c voltage derived from said circuit means for monitoring the operation of an electric circuit connected across said capacitor.

2. The combination of claim 1, wherein said set and reset coils are connected in series with one another.

3. The combination of claim 2, which further includes a second controlled rectifier and second set and reset coils and an indicator means for said second controlled rectifier.

* * * * *